(12) United States Patent
Khoshnevisan et al.

(10) Patent No.: US 8,805,838 B1
(45) Date of Patent: Aug. 12, 2014

(54) SYSTEMS AND METHODS FOR AUTOMATIC ITEM CLASSIFICATION

(75) Inventors: Cyrus Khoshnevisan, Mercer Island, WA (US); Abhishek Kansal, Bothell, WA (US); Lam D. Nguyen, Seattle, WA (US); Michael Paul Touloumtzis, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 423 days.

(21) Appl. No.: 12/645,420

(22) Filed: Dec. 22, 2009

(51) Int. Cl.
*G06F 17/30* (2006.01)

(52) U.S. Cl.
USPC ............................ 707/737; 707/740; 707/778

(58) Field of Classification Search
CPC .................................. G06F 7/00; G06F 17/30
USPC ......................................... 707/737, 740, 778
See application file for complete search history.

(56) References Cited

U.S. PATENT DOCUMENTS

| | | | |
|---|---|---|---|
| 5,943,670 A | 8/1999 | Prager | |
| 6,195,657 B1 | 2/2001 | Rucker et al. | |
| 6,654,744 B2 * | 11/2003 | Katayama et al. | 707/740 |
| 6,928,433 B2 * | 8/2005 | Goodman et al. | 386/243 |
| 7,349,917 B2 * | 3/2008 | Forman et al. | 1/1 |
| 7,840,521 B2 | 11/2010 | Aoki | |
| 7,966,329 B1 | 6/2011 | Rukonic et al. | |
| 8,001,125 B1 | 8/2011 | Magdalin et al. | |
| 2003/0182304 A1 * | 9/2003 | Summerlin et al. | 707/102 |
| 2005/0138079 A1 | 6/2005 | Liu et al. | |
| 2006/0282442 A1 | 12/2006 | Lennon et al. | |
| 2008/0046343 A1 * | 2/2008 | Maguire et al. | 705/27 |
| 2008/0243637 A1 | 10/2008 | Chan et al. | |
| 2009/0112916 A1 | 4/2009 | Stuhec | |
| 2010/0161620 A1 | 6/2010 | Lamere et al. | |
| 2010/0169361 A1 | 7/2010 | Chen et al. | |
| 2010/0179950 A1 | 7/2010 | Willcock | |

OTHER PUBLICATIONS

Report on automatic classification systems for the TERENA activity Portal Coordination. (Peter Gietz, Jun. 6, 2001).*
Co-pending U.S. Appl. No. 12/605,260, filed Oct. 23, 2009.
Co-pending U.S. Appl. No. 12/645,405, filed Dec. 22, 2009.
Report on automatic classification systems for the TERENA activity Portal Coordination. (Peter Gietz, Jun. 19, 2001).

* cited by examiner

*Primary Examiner* — Robert Timblin
(74) *Attorney, Agent, or Firm* — Knobbe Martens Olson & Bear, LLP

(57) ABSTRACT

An item categorization service is described that automatically categorizes items of interest to a user. The user may possess an item that they wish to offer for sale using a network-based service. The user may submit item information to the item categorization service to categorize the item of interest. Upon receipt, the categorization service may assess the relevance of the item information to hierarchically organized categories maintained by the network-based service. Categories having the highest relevance may be identified as first category candidates. The deepest common ancestor of the first category candidates may be identified the first category. One or more categories, representing sub-categories of the first category, may be identified and subjected to relevance assessment. Those sub-categories having the highest relevance may be identified as second category candidates. The deepest common ancestor of the second category candidates may be identified as a second category for the item of interest.

28 Claims, 7 Drawing Sheets

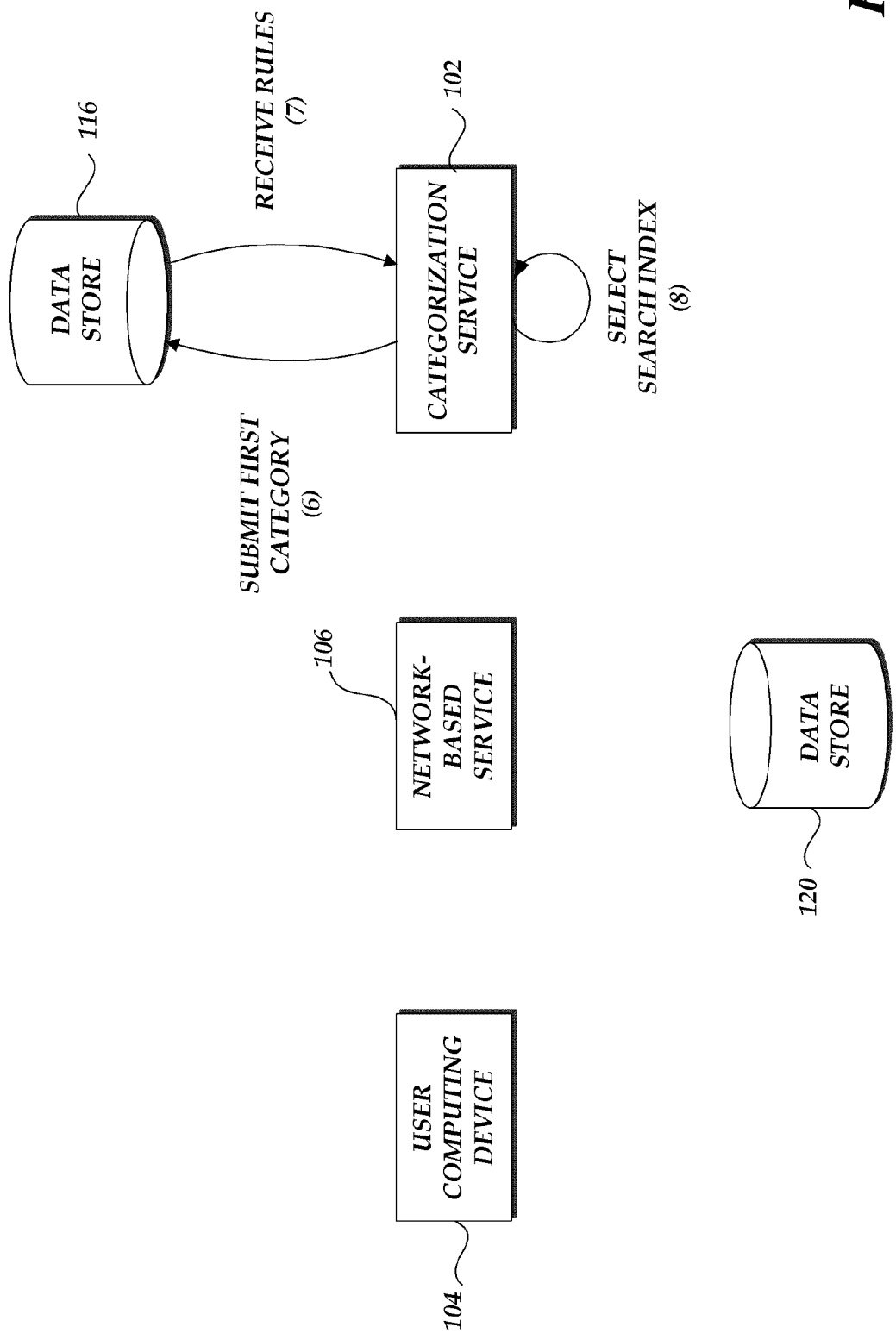

|                              | RELEVANCE CLUSTERING |                        |
|                              | TIGHT                | LOOSE                  |
| CATEGORY DISTANCE CLOSE      | HIGH CONFIDENCE      | MEDIUM-HIGH CONFIDENCE |
| CATEGORY DISTANCE FAR        | LOW CONFIDENCE       | MEDIUM CONFIDENCE      |

Fig. 5.

SYSTEMS AND METHODS FOR AUTOMATIC ITEM CLASSIFICATION

BACKGROUND

Generally described, computing devices and communication networks facilitate network-based commerce. For example, a user may employ his or her computing device to access a network-based retailer for the purchase of items and services (collectively and individually referred to as "items") such as music, books, and electronics, just to name a few.

To take advantage of this growing marketplace, sellers may elect to sell items through network-based retailers. For example, a book-seller may elect to sell books through a network-based retailer which offers books for sale. Accordingly, the seller may record some information regarding items to be offered for sale in an electronic form, such as a written description. This recorded item information may be provided to the network-based retailer to enable the item to be offered for sale by the network-based retailer.

Such a system may be problematic, however. A network-based retailer may have many possible categories into which an item may be categorized. As a result, it may be difficult to identify one or more appropriate categories for categorizing a seller's item. Furthermore, even if a number of appropriate categories can be identified for an item, it may be difficult to select the most appropriate categorization from these choices.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 3B is a block diagram of the operating environment of FIG. 1, illustrating identification of a search index for use in selecting a second category for the item of interest;

FIG. 5 is a schematic illustrating classifications of relevance clustering and document distance for use in identifying methodologies for categorizing items of interest.

DETAILED DESCRIPTION

Figure 1:
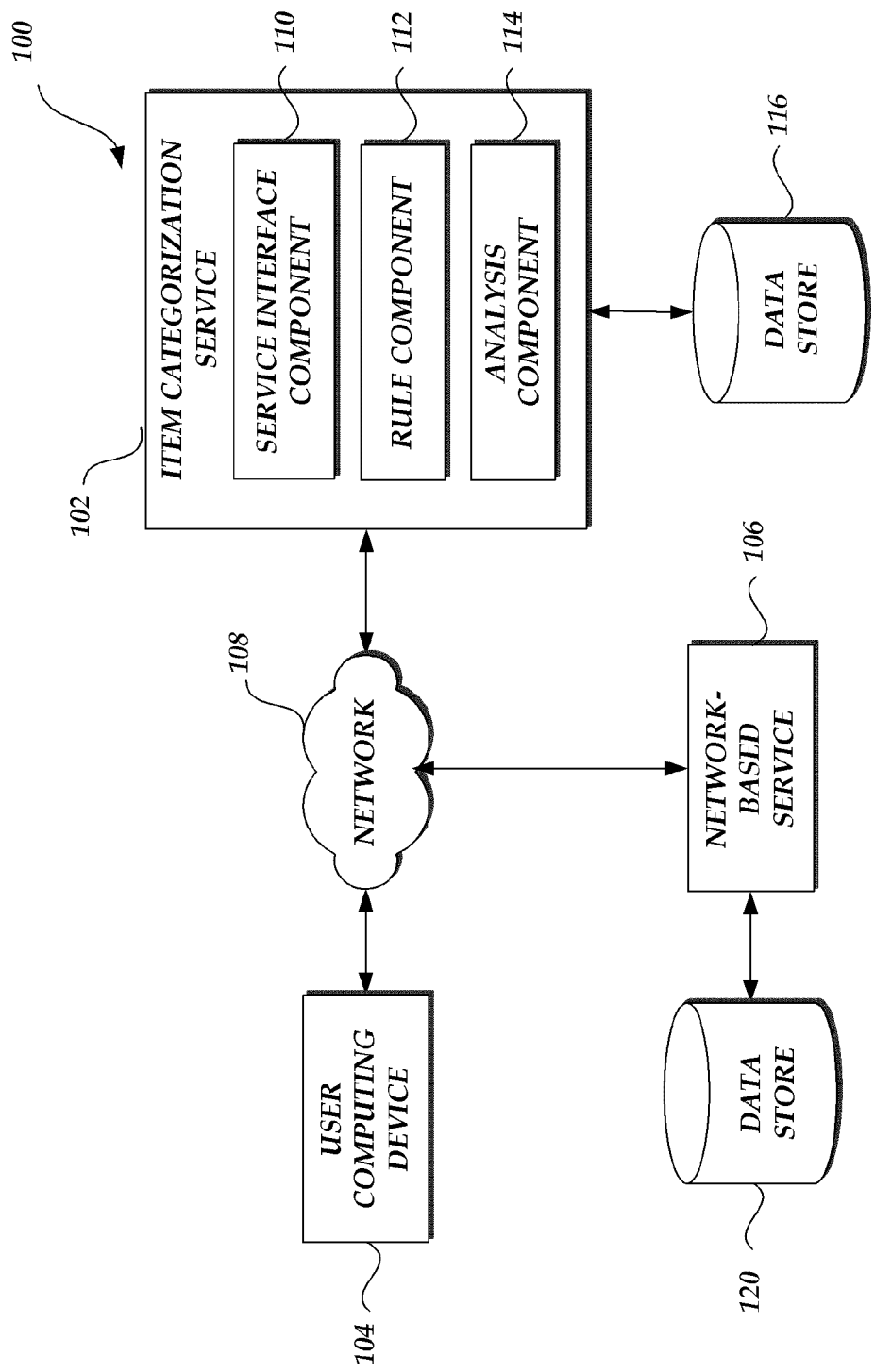
FIG. 1 is a block diagram depicting an illustrative operating environment in which an item categorization service assigns categories to items of interest to a user.

Generally described, embodiments of the present disclosure relate to automatically assigning categories to items of interest to a user (e.g., a seller of the item, such as a manufacturer, wholesaler, or retailer) based upon associated item information. The items of interest may be categorized in accordance with item categories maintained by a network-based service.

In this regard, an item categorization service is described that categorizes the items of interest on behalf of the user. For example, a user employing a user computing device may possess an item that they wish to offer for sale through the network-based service. The item may be anything capable of being offered for sale, for example, any good, service, or information. Accordingly, the network-based service may include network-based retailers such as those which sell items for purchase to a customer, network-based sources of entertainment and/or information (e.g., network-based encyclopedias, media sharing, etc), network-based social networking services which enable users to share content with one another, and the like.

As will be described in more detail below, in certain embodiments, the user may prepare an electronic description of one or more items (e.g., a file including at least a written description), including item attributes and corresponding item attribute values. For example, if an item is a men's athletic shoe manufactured by Brand X, the item attributes of the shoe may include, but are not limited to, gender, size, color, and the like. Item attribute values corresponding to the item attribute may include parameters which describe the item attributes. For example, the item attribute of "gender" may have possible attribute values of "male" and "female." The item attribute of size may have possible attribute values of "sizes 5-13." The item attribute of color may have possible attribute values of "red," "yellow," "blue," and the like.

In certain embodiments, the user may submit the item information to the item categorization service for categorization using a user computing device. In alternative embodiments, the item information may be obtained by the item categorization service from a source other than the user computing device. For example, the item information may be provided by the network-based service.

In certain embodiments, the categories may include one or more category attributes and respective category attribute values that describe the category. These categories may be collected in a first search index, which may include the category attributes and respective category attribute values for categories maintained by the network-based service. For example, continuing the example above, the category of "shoes" may be described by category attributes such as "gender," "size," and "color." Possible category attribute values corresponding to the category attributes may include, but are not limited to, gender attribute values ranging from "men's" to "women's," size attribute values ranging "male sizes 3-14" and "female sizes 3½ to 11½" and color attribute values ranging between "black," "brown," and "white."

The categories may also be organized hierarchically with respect to one another, where hierarchically inferior categories may be sub-categories of hierarchically superior categories. For example, the category of "shoes" may be hierarchically superior to a sub-category such as "athletic shoes", and hierarchically inferior to a category such as "footwear." Furthermore, in certain embodiments, the category attribute values of a selected category may be sub-categories of the selected category. For example, a category of "shoes" may include attributes of "gender," "size," and "color," any or all of which may be sub-categories of "shoes."

Upon receipt of the item information, the item categorization service may compare the item information to categories maintained in a search index stored in one or more data structures (e.g., databases). In certain embodiments, the comparison performed by the item categorization service may include a relevance assessment of the item information with respect to the categories. The relevance assessment may include one or more mathematical operations that quantify the degree to which a category matches, or is similar to, the item information.

The relevance values determined in this manner may be employed in conjunction with an analysis of category hierarchies to determine a first category for assignment to the item of interest. For example, a selected number of categories (e.g., the top five) which exhibit the highest relevance to the item information for the item of interest may be identified as first category candidates. The respective positions of each of the first category candidates within a hierarchy of categories may be further examined to determine a deepest common ancestor shared by a majority of the first category candidates (e.g., at least three out of five). This common ancestor may be selected to be the first category.

In an embodiment, the assigned first category may be further refined through the use of one or more rules. Briefly, the rules may specify one or more category attributes for the first category whose corresponding attribute values may refine the categorization of the item of interest beyond the first category. For example, assuming that the first category is "shoes," and the category attribute of "gender" is identified by the rules, category attribute values such as "men's" or "women's" may further refine the first category of "shoes" (e.g., "men's shoes" or "women's shoes").

In order to accomplish this refinement of the first category, the values of the category attributes identified by the rules are determined. In one aspect, one or more categories may be identified, each of which include the category attributes of the first category identified by the rules. This collection of categories may be referred to as restricted categories, to distinguish them from other collections of categories which are not constrained by limitations on the content of the category attributes by which they are described.

In another aspect, the restricted categories may be employed in a second relevance comparison operation with the item information for the item of interest. Based upon the second relevance assessment, a selected number of the restricted categories (e.g., the top five) may be identified as second category candidates. The hierarchical relationships of the second category candidates may be examined and the deepest common ancestor shared by a majority of the second category candidates may be assigned as the second category. The process of second category assignment may be repeated for as many rules and respective category attributes associated with the first category as are identified.

To facilitate performing the relevance comparisons, in certain embodiments, the unrestricted and restricted categories may be maintained in separate search indices and/or different data structures within the same search index. For example, a first search index may store unrestricted categories for use in assigning a first category to the item of interest. In another example, a second search index may include restricted categories, for use in assigning one or more second categories to the item of interest. Second search indices may each be prepared for selected category attributes, as necessary, (e.g., a search index for each of "gender," "size," "color," and the like). The first and second search indices may include any item categories maintained by the network-based service.

In a further embodiment, a confidence level may be determined for the item categorization discussed above on the basis of relevance clustering and category distances. Relevance clustering refers to a measure of the spacing between a selected number of relevance values assessed for an item of interest and unrestricted categories, as discussed above (e.g., a selected number of categories having the highest relevance values). As discussed in greater detail below, relevance values of pairwise combinations of selected categories may be aggregated and the aggregated relevance classified as either tightly clustered, where the relevance values for the item of interest are relatively close to one another, or loosely clustered, where the relevance values for the item of interest are relatively far from one another.

Category distances may refer to measurement of the similarity between selected categories. For example, the selected categories may be the categories having the highest relevance values discussed above. As discussed below, the respective category distances between pairwise combinations of selected categories may be aggregated and the aggregated category distance classified as either close or far. Close category distances indicate that the categories are relatively similar to one another, while far category distances indicate that the categories are relatively dissimilar to one another.

By combining the relevance clustering and category distances, different confidence levels in the item categorization may be established. For example, assuming relevance clustering results may be classified into tight and loose clustering and category distances may be classified into far and close distances, four different combinations of relevance clustering and category distances may be identified, each having a different confidence level: tight relevance clustering and close category distance, tight relevance clustering and far category distance, loose relevance clustering and close category distance, and loose relevance clustering and far category distance.

In alternative embodiments, other routines for categorizing items of interest using relevance assessments are also envisioned by embodiments of the present disclosure. In an embodiment, the categorization approach discussed above may be modified. The manner in which the first and second category candidates are selected remains the same, however, categories are assigned on the basis of a statistical analysis of the likelihood of category pairings, rather than by selection of a common ancestor. For example, the statistical likelihood that pairs of each of the respective first and second category candidates are combined together may be determined. The categories having the highest likelihood of being in combination may be assigned to the item of interest. It may be understood that this mechanism is not limited to pairs of categories but may be extended to any combination of first and second category candidates. For example, statistical likelihoods may be examined for a first category candidate and multiple second category candidates (e.g., "shoes" and "men's" and "brown") and the group of categories having the highest likelihood of being combined may be assigned to the item of interest.

In another embodiment, relevance assessments of unrestricted categories may be employed with specific category attributes to identify a first category and one or more second categories. For example, an unrestricted category may be described by an attribute "first category" having possible attribute values of "yes" or "no." The unrestricted category having the highest relevance value and further having an attribute value of "yes" for the attribute "first category" may be assigned as the first category. At least a portion of unrestricted categories having higher relevance values than the first category and an attribute value of "no" for the attribute "first category" may be assigned as second categories.

With reference to FIG. 1, an illustrative operating system 100 is shown, including an item categorization service 102 that categorizes items of interest. For example, as discussed in greater detail below, the item categorization service 102 may assign categories to the item of interest based upon associated item information submitted by the user computing device 104. The category assignments may be determined based upon the relevance of the item information to item categories (e.g., unrestricted and restricted categories) maintained by a network-based service 106. In certain embodiments, the network-based service 106 may be a network-based retail service implemented via a website that offers one or more items for sale. Items categorized by the item categorization service 102 may be stored by the network-based service 106 in a data store 120 and presented within one or more categories of items offered for sale by the network-based service 106.

It may be recognized that many of the components described below are optional and that embodiments of the system 100 may or may not combine components. Components need not be distinct or discrete. Components may be reorganized in the system 100. The system 100 may be represented in a single physical server containing all of the subsystems described below or, alternatively, the system may be split into multiple physical servers. For example, in certain embodiments, the item categorization service 102 may be housed within the network-based service 106. In alternative embodiments, the item categorization service 102 may include a stand-alone service. In additional embodiments, the item categorization service 102 may be housed within one or more user computing devices 104.

The item categorization service 102 and network-based service 106 may each be embodied in a plurality of components, each executing an instance of the respective item categorization service 102 or network-based service 106. A server or other computing component implementing the item categorization service 102 or network-based service 106 may include a network interface, memory, processing unit, and computer readable medium drive, all of which may communicate which each other may way of a communication bus. The network interface may provide connectivity over a network 108 and/or other networks or computer systems. The processing unit may communicate to and from memory containing program instructions that the processing unit executes in order to operate the item categorization service 102 or network-based service 106. The memory generally includes RAM, ROM, and/or other persistent and auxiliary memory.

In one embodiment, the user computing device 104 may communicate with the categorization service 102 and network-based service 106 via a communication network 108, such as the Internet or a communication link. Those skilled in the art will appreciate that the network 108 may be any wired network, wireless network or combination thereof. In addition, the network 108 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The user computing device 104 may include any computing device, such as a laptop or tablet computer, personal computer, personal digital assistant (PDA), hybrid PDA/mobile phone, mobile phone, electronic book reader, set-top box, camera, digital media player, and the like. The user computing device 104 may also be any of the aforementioned devices capable of receiving or obtaining data regarding an item of interest from another source, such as a digital camera, a remote control, another computing device, a file, etc.

In embodiments discussed below, the item categorization service 102 of FIG. 1 may assign categories to an item of interest in response to receipt of item information regarding the item of interest from the user computing device 104. It may be understood, however, that the item categorization service 102 may also be employed to assign categories in response to receipt of item information from the network-based service 106. For example, the network-based service 106 may store records of prior item information submissions. It may be desirable to provide this item information to the item categorization service 102 in order to verify and/or update the categories assigned to the items described by the previously submitted item information.

With further reference to FIG. 1, the categorization service 102 may include one or more components for use in categorizing items of interest described by submitted item information. In one embodiment, the categorization service 102 may include a service interface component 110. The service interface component 110 may enable the categorization service 102 to receive item information (e.g., from the user computing device 104 or other computing resource in communication with the item categorization service 102 via the network 108) and transmit item information which has been updated to include one or more categories for the item of interest (e.g., to the network based service 106).

In further embodiments, the categorization service 102 may further include a rule component 112. The rule component 112 may be employed to identify attributes for a selected category that may be employed in further categorization operations The item categorization service 102 may additionally include an analysis component 114 for performing a variety of analyses with respect to the item information and categories in order to assign categories to the item of interest. In embodiment, the analysis component may determine the relevance between items of interest and selected item categories, as well as similarities between categories. The analysis component 114 may further be employed to examine the hierarchies of selected categories and determine their deepest common ancestors. The analysis component 114 may also assign categories to items of interest based upon the statistical likelihood of pairings of categories. The analysis component may further assign categories to items of interest based upon relevance clustering and category distances. It may be understood that this list is not exhaustive and other analytical operations may be performed by the analysis component 114, as necessary, without limit.

The item categorization service 102 may further be in communication with one or more search indices maintained in one or more data stores, represented by data store 116. The data store 116 may include information representing one or more categories of items. These categories of items may reflect categories maintained by the network-based service 106, enabling items of interest categorized by the item categorization system 102 to be easily added to the categories of the network-based service 106. This information may include, but is not limited to, attributes and respective attribute values associated with the categories, referred to as category attributes and category attribute values for clarity. It may be understood, however, that item attributes and item attribute values may be the same as category attributes and category attribute values, the distinction of "item" and "category" being used to distinguish the attribute or attribute value being discussed.

The categories maintained by the data store 116 may also be grouped in a variety of ways. In one aspect, the categories may include any of the categories maintained by the network-based service 106. This grouping of categories may be referred to herein as unrestricted categories, as no limitations are placed upon the categories. In another aspect, categories may be grouped according to possession of a category attribute value corresponding to a selected category attribute. This grouping of categories may be referred to herein as restricted categories. The categories may be further organized hierarchically with respect to one another.

The service interface component 110 may enable a user of the user computing device 104 to submit item information to the item categorization service 102. For example, an application executing on the user computing device 104 may generate one or more user interfaces that enable communication with the service interface component 110 for submission of item information regarding an item of interest. The item information may further include one or more item attributes and item attribute values for the item of interest. The item information may be submitted in formats including, but not limited to, flat files. In alternative embodiments, the service interface component 110 may enable the user to directly input item information without storing the item information in a file.

The analysis component 114 may be employed to assign categories to the item of interest based upon selected analysis of the categories and the submitted item information. In one embodiment, the analysis component 114 may be employed to perform a relevance assessment of the received item information and one or more of the unrestricted categories stored by the data store 116. Relevance represents a measurement of topical relevance or aboutness. That is to say, how well a topic of a result (e.g., the one or more categories) matches an information need (e.g., the item information submitted for the item of interest). The relevance assessment the item information to a selected category may be made using any mathematical framework understood by those of skill in the art to determine the similarity between the item information (e.g., item attributes and/or item attribute values) and the category (e.g., category attributes and/or category attribute values).

In certain embodiments, the relevance of a category to the item information may be determined on the basis of vectors representing the item information for the item of interest and the category. For clarity, vectors representing item information for the item of interest may be referred to as item vectors, while vectors representing the category attributes and/or category attribute values of a selected category may be referred to as category vectors. The vectors include a mathematical representation of at least a portion of the text information included within the received item information and selected categories (e.g., respective item attributes and item values of the item information and respective category attributes and category attribute values of the selected category).

In certain embodiments, a vector space model may be employed to generate the item and category vectors. For example, each dimension of an item or category vector may correspond to a separate term of their respective item information or category. Thus, if a term occurs in the item information, the value of that term in the item vector may be non-zero and similarly for the category vector. In certain embodiments, the value of a term in an item vector may include the frequency with which the term occurs in the item information. In further embodiments, the values of each of the terms of the item vector may be further weighted, using weighting schemes understood in the art. Examples of such weighting schemes may include, but are not limited to, term frequency-inverse document frequency modeling (tf-idf).

The analysis component 114 may compare the item and category vectors to assess the relevance between the item information and the selected category. In an embodiment, the vector comparison may include the deviation of the angles between the item vector and the category vector under consideration. In another embodiment, the vector comparisons may include the cosine of the angle between the item vector and the category vector under consideration. The resulting relevance may range between zero to one, with zero indicating no relevance between the item of interest and the selected category and one indicating a high relevance between the item of interest and the selected category. It may be understood that this description of vector comparisons is not exhaustive and that other methods of calculating relevance known in the art may be employed within the scope of the disclosed embodiments.

The analysis component 114 may also choose one or more unrestricted categories as candidates for a first category, according to their assessed relevance. In one embodiment, a selected number of the unrestricted categories having the highest relevance values may be chosen as candidates for the first category. For example, the five unrestricted categories having the highest relevance may be chosen as the first category candidates.

The analysis component 114 may further analyze the respective hierarchies of the first category candidates in order to determine the first category to be assigned to the item of interest. The deepest common ancestor of the first candidate categories (e.g., at least three out of five) may be selected to be the first category. In certain embodiments, the deepest common ancestor may also include one of the first candidates themselves.

Figure 2A:
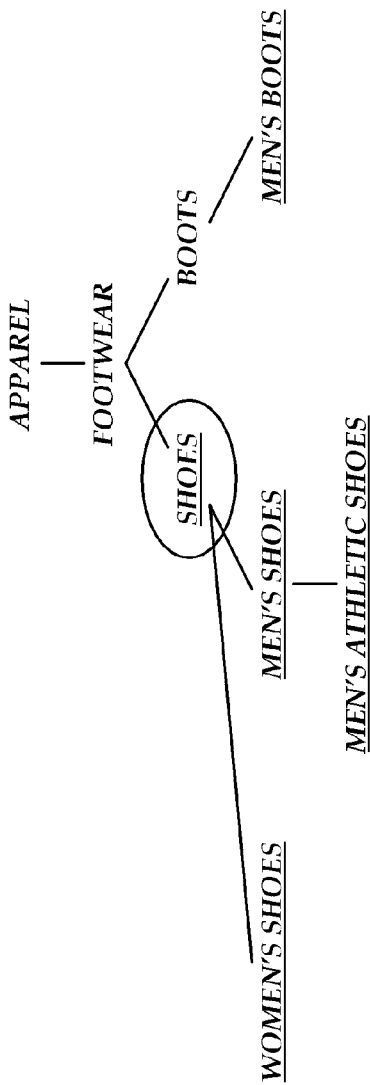
FIGS. 2A and 2B are diagrams depicting illustrative hierarchies of first and second category candidates for use in assigning respective first and second categories for the item of interest.

FIG. 2A illustrates one embodiment of this first category selection process. Assume that category candidates of "shoes," "men's shoes," "women's shoes," "men's boots," and "men's athletic shoes" are determined to be the five unrestricted categories having the highest relevance to the item of interest, illustrated in the category hierarchy of FIG. 2A as underlined. It may be observed from FIG. 2A that "shoes" is a common ancestor to a majority of these category candidates (e.g., "shoes," "men's shoes," "women's shoes," and "men's athletic shoes." Therefore, "shoes" may be assigned as the first category to the item of interest.

The rule component 112 may be employed to identify rules that specify one or more category attributes for the first category for use in determining one or more second categories that refine the categorization provided by the first category. For example, the rule component 112 may communicate with the data store 116 to retrieve one or more such rules. The rule component 112 may further transmit this information to the analysis component 114 for use in assigning the second category.

Upon receipt of the category attributes identified by the rules, the analysis component 114 may further obtain restricted categories that include the specified category attributes. For example, continuing the example above, if the first category is "shoes" and the rules component specifies the category attribute of "gender," then the appropriate restricted categories may include the "gender" attribute and an attribute value for "gender" (e.g., male or female).

A second relevance assessment of the item of interest and the restricted categories may be performed, as discussed above. Second category candidates may be chosen from the restricted categories having the highest relevance (e.g., the highest five). Furthermore, the common ancestor possessed by a majority of the second category candidates (e.g., three out of five) may be selected to be the second category. This process may be repeated for each of the category attributes specified by the rule component 112

Figure 2B:
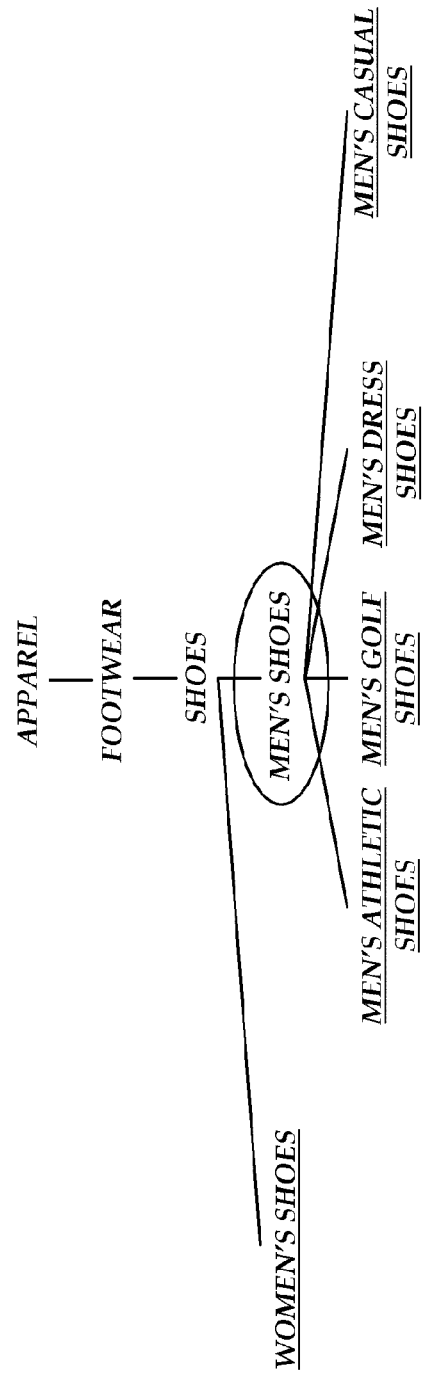

Continuing the example begun above, assuming a category attribute specified by the rules component is "gender," the hierarchy of the second category candidates may be examined to determine the appropriate category attribute value (e.g., "men's" or "women's"). Further assume that second candidates of "women's shoes," "men's casual shoes," "men's athletic shoes," "men's golf shoes," and "men's dress shoes" are determined from the second relevance assessment, illustrated as underlined in FIG. 2B. From FIG. 2B, it may be observed that "men's shoes" is the most common ancestor of the second category candidates. Therefore, "men's shoes" or "men's" may be assigned to the item of interest as the second category.

Although described as components of the item categorization service 102, the service interface component 110, the rule component 112, and/or the analysis component 114 may be discrete components from the item categorization service 102. Accordingly, the categorization service 102 may include one or more interface components for communication with the service interface component 110, the rule component 112, and/or the analysis components 114 via the network 108.

In further embodiments, the categorization service 102 may be housed within one or more user computing devices 104 and operate as discussed above. For example, categories, both unrestricted and restricted, may be retrieved from the data store 116. In alternative embodiments, categories may be stored by the data store 116 and pushed to the user computing device 104 when updated. Beneficially, by storing the categories locally, and pushing updates to the user computing devices 104, the user computing devices 104 may employ the item categorization service 102 residing locally to categorize items of interest to the user without the need for communication with the network 108.

Figure 3A:
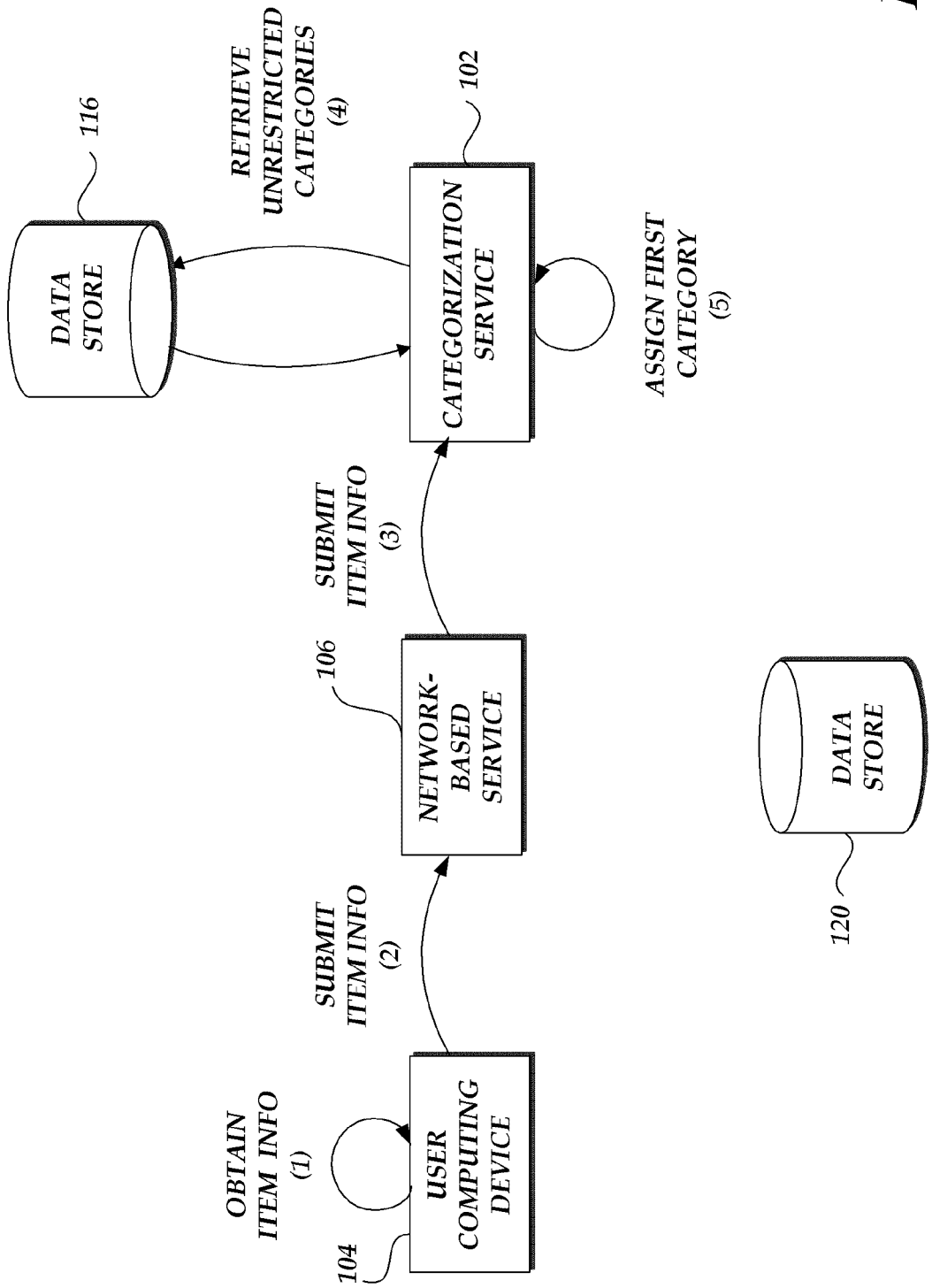
FIG. 3A is a block diagram of the operating environment of FIG. 1, illustrating submission of item information to the item categorization service and the selection of a first category for an item of interest.

FIG. 3A is a block diagram of the operating environment of FIG. 1, illustrating the submission of a request to categorize an item of interest to the item categorization service 102. In certain embodiments, the request may be submitted from the user computing device 104 to the categorization service 102 via one or more other computing devices (e.g., network based service 106). In alternative embodiments, the request may be submitted directly to the categorization service 102. The categorization request may include, but is not limited to, item information regarding the item of interest.

In one embodiment, the item information may be obtained by the user computing device 104 prior to submission of the request. For example, the item information may be obtained as one or more files from another computing device through the network 108. In another example, the item information may be obtained by generating one or more files containing the item information on the user computing device 104. In one example, a request to categorize the item of interest may be submitted by identifying one or more files containing item information and to submitting the identified files containing the item information to the categorization service 102.

Upon receipt of the request, the item categorization service 102 may employ the item information to assign a first category to the item of interest. For example, the item categorization service 102 may retrieve a first search index including unrestricted categories from the data store 116. The item categorization service 102 may further determine first category candidates from a relevance assessment of the item information and the unrestricted categories and analyze the hierarchical relationships of the first category candidates to identify their deepest common ancestor. This deepest common ancestor may be assigned as the first category.

FIG. 3B is a block diagram of the operating environment of FIG. 1, illustrating submission of the assigned first category to the data store 116 by the item categorization service 102. In response to receiving the submitted first category, the data store 116 may return one or more rules identifying category attributes for the first category that may be used in refinement of the assigned first category. The item categorization service 102 may further identify one or more second search indices that maintain restricted categories which possess the category attributes identified by the rules.

Figure 3C:
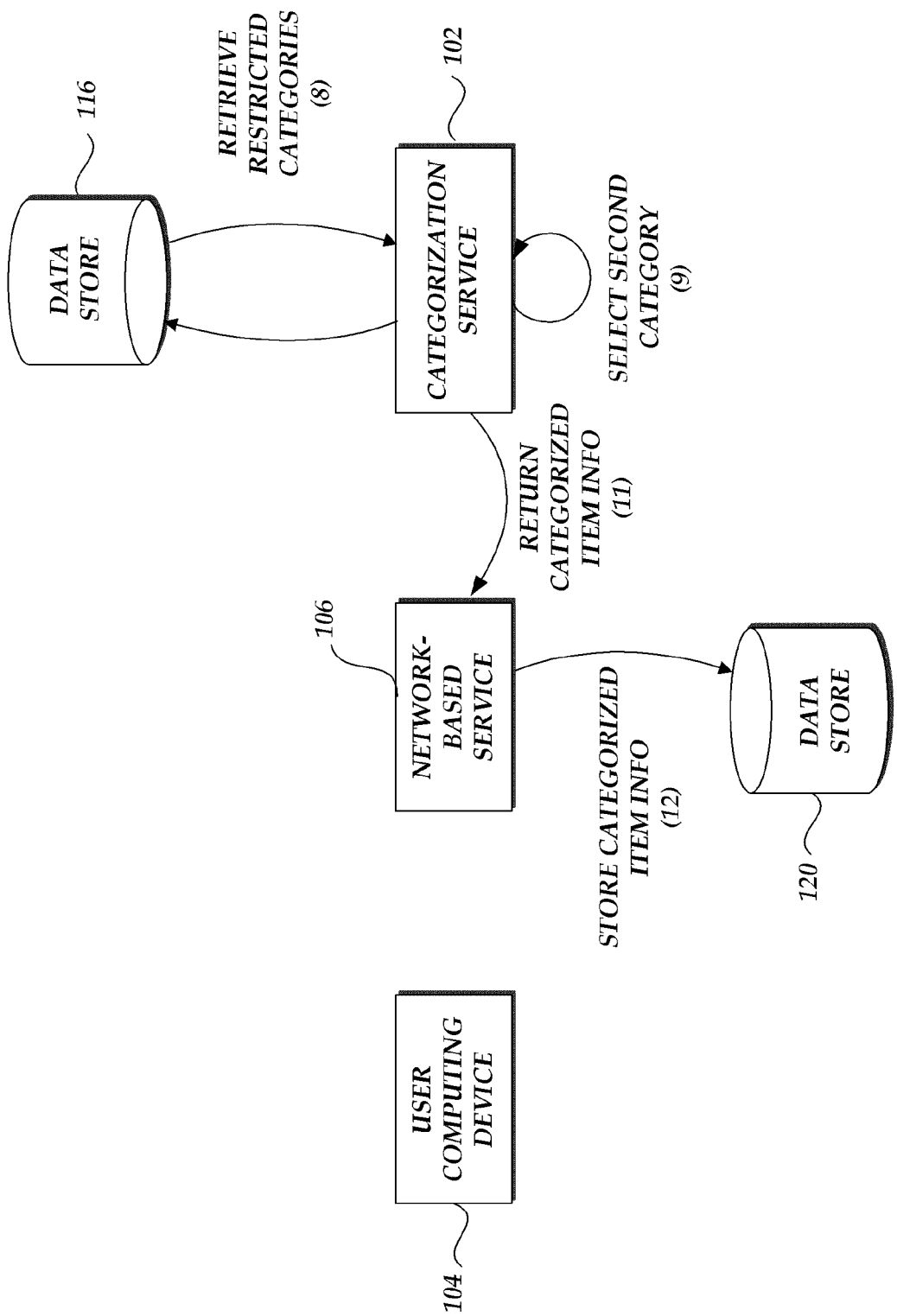
FIG. 3C is a block diagram of the operating environment of FIG. 1, illustrating identification of use of the search index to select the second category.

FIG. 3C is a block diagram of the operating environment of FIG. 1, illustrating use of a second search index containing restricted categories for selection of a second category corresponding to the first assigned category. The item categorization service 102 may determine second category candidates from a second relevance assessment between the item information and the restricted categories. The hierarchical relationships of the second category candidates may also be analyzed to identify their deepest common ancestor, which may be assigned as a second category. Subsequently, the item information, including the assigned first category and one or more assigned second categories, may be returned to the network-based service 106 for storage in data store 120.

Figure 4:
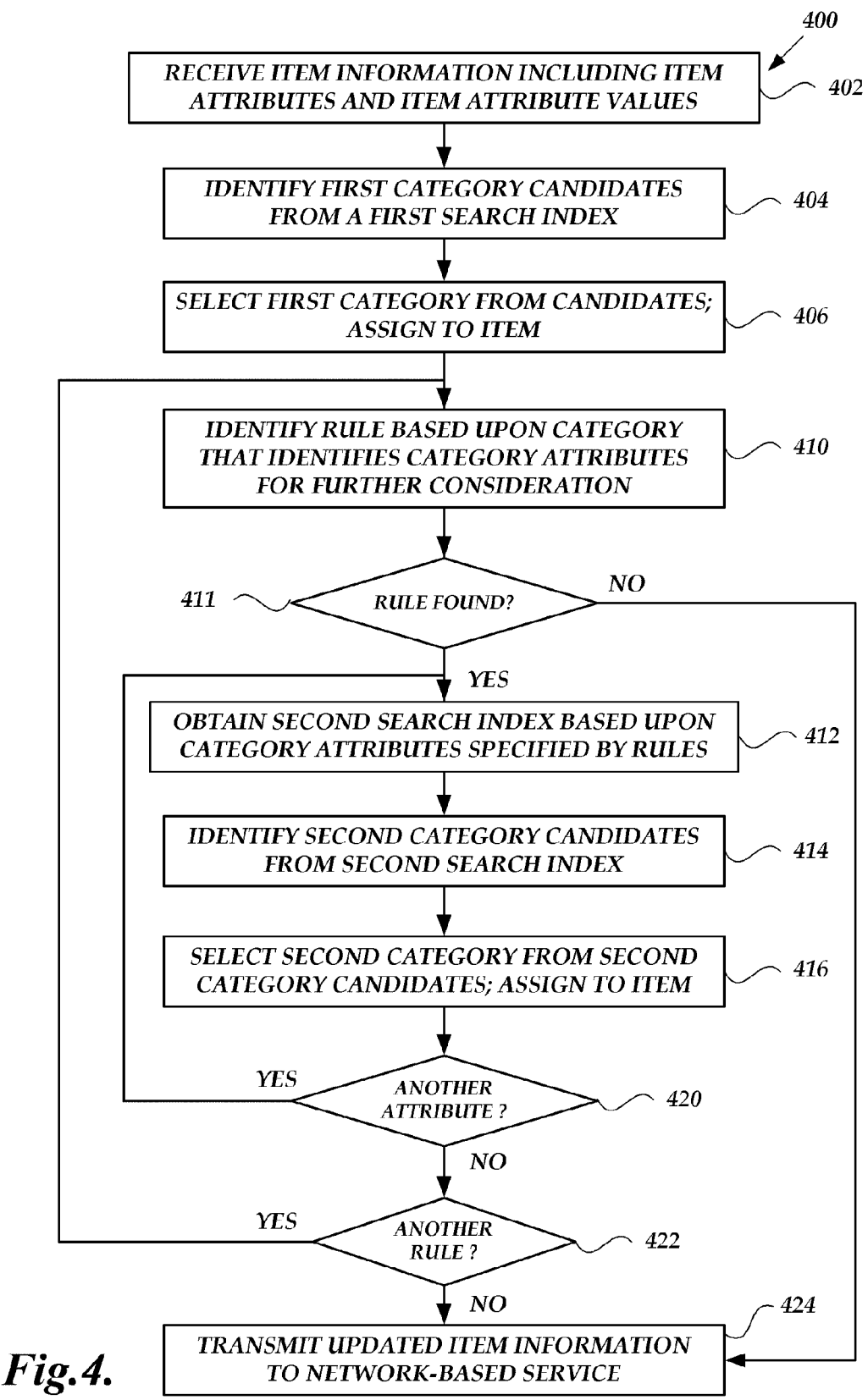
FIG. 4 is a flow diagram of an illustrative routine implemented by the item categorization service to assign categories to an item of interest.

FIG. 4 is a flow diagram of an illustrative routine 400 implemented by the item categorization service 102 to assign categories to an item of interest. The routine 400 begins in block 402, where the item categorization service 102 receives a request to categorize an item of interest, including item attributes and item attribute values.

In block 404, the item categorization service 102 may identify first category candidates from a first search index. As discussed above, the first search index may include unrestricted categories and may be obtained from the data store 116 or other data storage device. The identification may include performing a relevance assessment of at least a portion of the unrestricted categories included within the first search index. A selected number of the unrestricted categories exhibiting the highest relevance values may be identified as the first category candidates.

In block 406, a first category may be selected using the first category candidates and assigned to the item of interest. In certain embodiments, the categories may be hierarchically organized. As such, the respective category hierarchies of the first category candidates may be examined and the deepest common ancestor of the first category candidates, assigned as the first category to the item of interest.

In block 410, an identification may be made as to one or more category attributes of the first category which may be employed to further refine the categorization provided by the first category. In one aspect, the identification may be made by obtaining one or more rules from the data store 116 or other data storage device.

In decision block 411, a determination may be made as to whether any rules for the first assigned category are found in the data store 116. If one or more rules are found, the routine 400 moves to block 412, where a second category may be identified for the item of interest. If one or more rules are not found, the routine 400 moves to block 424, where the annotated item information, including the assigned first category, may be transmitted to the network-based service 106.

In block 412, a second search index may be obtained that is based upon the category attributes specified by the obtained rules. In certain embodiments, the second search index may include categories that are constrained to include the category attribute identified by the rules, as well as the respective category attribute values. The second search index may be obtained from the data store 116 or other data storage device, as necessary.

In block 414, the item categorization service 102 may identify one or more second category candidates from the second search index. As discussed above, the second search index may include restricted categories and second category candidates may be identified by performing a relevance assessment between the item information and at least a portion of the restricted categories maintained by the second search index. A selected number of the restricted categories exhibiting the highest relevance to the item of interest may be identified as the second category candidates.

In block 416, a second category may be selected using the second category candidates and assigned to the item of interest. In certain embodiments, the categories within the second search index may be hierarchically organized. The respective category hierarchies of the second category candidates may be examined and the deepest common ancestor of the second category candidates assigned as a second category to the item of interest.

In decision block 420, a determination may be made as to whether additional category attributes remain to be evaluated from the identified classification rule. If there are additional category attributes having values that remain to be evaluated, the routine 400 returns to block 412, where a new search index corresponding to a selected one of the remaining category attributes may be obtained and blocks 412-416 are repeated using the new search index to determine new second category candidates and another second category.

If there are no additional category attributes that remain to be evaluated, the routine 400 moves to block 422. In block 422, a determination may be made as to whether another rule specifying additional category attributes remains. In one embodiment, such a rule may be obtained based upon the first assigned category. In other embodiments, the rule may be obtained based upon an assigned second category. If additional rules remain, the routine 400 may move to block 410, where one of the additional rules may be identified and the routine 400 continues through blocks 410-416 as discussed above to assign another second category to the item of interest.

If there are no additional rules which remain to be identified, the routine 400 may move to block 424, where updated item information, including a first assigned category and one or more second assigned categories, may be transmitted to the network-based service 106. At the network based service 106, the item information may be stored by the data store 120, enabling the item of interest to be present appropriate category maintained by the network-based service 106, enabling the item of interest to be easily found and purchased. In alternative embodiments, the updated item information may be stored by the item categorization service 102 for transmission to the network-based service 106 or other computing device at a later date.

In a further embodiment, a confidence level in the categorization discussed above may be assigned on the basis of relevance clustering and category distances. Relevance between the item information for the item of interest and selected unrestricted categories may be assessed as discussed above. Relevance clustering may characterize the amount by which the relevance values of selected categories are separated from one another. The selected categories may include, but are not limited to, a selected number of unrestricted categories having the highest assessed relevance. For example, in an embodiment, the assessed relevance values may be aggregated and compared to a threshold in order to classify the relevance clustering of the item categorization. In one embodiment, the aggregated relevance values may be represented by the maximum pairwise difference between assessed relevance values. In another embodiment, the aggregated relevance values may be represented by an average pairwise difference between assessed relevance values. In a further embodiment, the aggregated relevance values may be represented by a sum of the pairwise differences between respective assessed relevance values. In additional embodiments, relevance values represented by a sum may include sums that are weighted based upon their respective relevance values.

The clustering of relevance values may be further classified according to their separation distance as compared with a threshold value. In certain embodiments, item categorizations having aggregated relevance values greater than the threshold value may be classified as loosely clustered, while item categorizations having aggregated relevance values less than the selected value may be classified as tightly clustered. It may be understood that alternative mechanisms for determining the aggregated relevance values and classifying the nature of the clustering may be employed without departing from the spirit of the disclosed embodiments.

Category distances may refer to the similarity of categories with respect to one another. Specifically, the categories of interest in this context may include the selected number of unrestricted categories having the highest assessed relevance to the item of interest. In certain embodiments, the category distance may be determined using a vector analysis, as discussed above with respect to the relevance assessment. In this case, though, the vector analysis is performed on the basis of vectors representing the categories under examination. A vector space model may be employed to generate the respective category vectors and the analysis component 114 may assess the distance between respective category vectors.

The assessed category distances may be aggregated and compared to a category threshold in order to classify the category distance of the item categorization. In one embodiment, the aggregated category distance may be represented by the maximum pairwise separation between assessed category distances. In another embodiment, the aggregated category distance may be represented by the average pairwise difference between assessed category distances. In a further embodiment, the aggregated category distance may be represented by the sum of the pairwise differences between respective assessed relevance values. In additional embodiments, category represented by a sum may include sums that are weighted based upon their respective relevance values. Aggregated category distances greater than the threshold value may be classified as far category distance, while aggregated category distances less than the threshold may be classified as close category distance. It may be understood that alternative mechanisms for determining the category distance and classifying the nature of the category distance may be employed without departing from the scope of the present disclosure.

Having classified the relevance clustering and category distances, these classifications may be combined to establish a confidence level for the item categorization discussed above. For example, based upon classifications for the relevance clustering of tight and loose and classifications for the category distances as close and far, combinations of tight clustering and close distance, tight clustering and far distance, loose clustering and close distance, and loose clustering and far distance may be established, as illustrated in FIG. 5. Based upon the respective classification of the item of interest in this relevance clustering-document distance space, different routines may be employed for determining categories for the item of interest.

As illustrated in FIG. 5, a classification of tight relevance clustering and close category distance may provides a high confidence level of that unrestricted categories possessing a high relevance to the item of interest are an accurate categorization of the item of interest. Notably, relevance values do not provide an absolute measure of relevance but rather a relative measure of relevance. For example, absent additional information, a close clustering of relevance values may indicate that analyzed unrestricted categories possess near equally poor relevance or may indicate that the unrestricted categories possess near equally good relevance. The result that the category distances are close, however, indicates that the unrestricted categories are similar to one another. Therefore, the close category distance, in combination with the tight relevance clustering, provides high confidence that the highest relevance unrestricted categories are good representations of the item of interest.

As further indicated in FIG. 5, loose relevance clustering and close category distance, as well as loose clustering and far category distance, may provide a medium-high to medium level of confidence in assessed relevance of the unrestricted categories. In general, a classification of loose relevance clustering, whether the category distance is close or far, will yield a level of confidence in the relevance assessment which is lower than that obtained in the case of tight clustering and close document distance.

Loose relevance clustering may indicate that some of the unrestricted categories may have poor relevance with the item of interest, while other unrestricted categories may have good relevance with the item of interest. The finding of close category distance, though, may indicate that the categories are relatively similar to each other. Therefore, in absolute terms, at least some of the uncategorized candidates may be relatively good category candidates for the item of interest, with those unrestricted categories having relative high relevance likely to be the best category candidates.

Loose relevance clustering in combination with far document distance may indicate that that some of the unrestricted categories may have good or poor relevance with the item of interest and that the categories are relatively dissimilar to one another. Therefore, in absolute terms, those categories having relatively high relevance are likely to be better category candidates for the item of interest than those with low relevance.

As also indicated in FIG. 5, tight relevance clustering and far document distance indicates low confidence in the relevance assessment. As discussed above, the relevance assessment provides a relative, not absolute measure of relevance of the unrestricted categories to the item information for the item of interest. Tight clustering may be equally indicative of that the unrestricted categories are relatively relevant, in an absolute sense, as relatively irrelevant. The addition of the far document distance, however, indicates that the unrestricted categories are relatively dissimilar to one another. In view of this observation, it may be concluded that the tightly clustered categories may have a relatively poor relevance with the item of interest.

In further embodiments, the confidence level may be employed to assign alternative routines for item categorization. For example, in the case of tight relevance clustering and close category distance, the following categorization routine may be followed. In one embodiment, one or more attribute values associated with the unrestricted category having the highest relevance value may be assigned as categories. This rule reflects the observation that, the close category distance, in combination with the tight relevance clustering, provides high confidence that the unrestricted category having the highest assessed relevance is a likely to be a good representation of the item of interest. For example, assuming that the category having the highest assessed relevance is "clothes" and that this category further possesses at least attribute values of "silk" and "pajamas," at least one of "silk" and "pajamas" may be assigned to the item of interest as categories.

As discussed above, in the case of loose relevance clustering and close category distance or loose relevance clustering and far category distance, those results having relative high relevance are likely to be better category candidates for the item of interest. Thus, embodiments of the routine for assigning first and second categories for the item of interest may be employed as discussed above with respect to FIGS. 2A-2C.

Under circumstances of tight relevance clustering and far category distance, the item of interest may be alternatively categorized as follows. A selected number of the unrestricted categories having the highest relevance values (e.g., the top five) may be identified as first category candidates. The deepest common ancestor of each of the first category candidates may then identified by examining the category hierarchy of each of the respective first category candidates and assigned as the first category. In the case that no common ancestor is identified for all of the first category candidates, the item categorization service 102 may fail to return a first category. Additionally, in certain embodiments, no identification of a second category may be made under these conditions, reflecting the observation that, whatever category is assigned to the item of interest from the first category candidates, it is likely to be a poor representation of the item of interest.

In alternative embodiments, other procedures for categorizing items of interest using relevance assessments are also envisioned by the present disclosure. In one embodiment, relevance assessments of unrestricted categories maintained by the network-based service 106 may be employed with specific category attributes to identify the first category and one or more second categories. For example, each of the unrestricted categories may be described by an attribute "first category" that has possible attribute values including "yes" and "no," which represent whether or not the unrestricted category may be considered as a first category. It may be understood that other names for such an attribute may be ascribed without limit.

As discussed above, the item categorization service may assess the relevance of the item information to the unrestricted categories to order the unrestricted categories in terms of descending relevance values. The unrestricted category having the highest relevance and further described by the category attribute value of "yes" to the category attribute "first category" may be assigned as the first category of the item of interest. One or more of the unrestricted categories having higher relevance values than the first category may be assigned as second categories of the item of interest. In certain embodiments, all of the unrestricted categories having higher relevance values than the first category may be assigned as second categories of the item of interest For example, assume that for an item of interest "Men's Running Shoes, Black, Brand X," the unrestricted categories of highest relevance, listed from highest to lowest relevance, are: "men's athletic shoes," "athletic shoes," "shoes," "women's shoes," and "men's boots." Further assume that of these categories, "shoes" is the unrestricted category having the highest relevance value and further having an attribute value of "yes" for the "first category" attribute. Therefore, the first category assigned to the item of interest may be "shoes." Either or both of the categories of "men's athletic shoes," and "athletic shoes," which each possess relevance values higher than "shoes," may be assigned as second categories for the item of interest.

In another embodiment, a relevance assessment may be combined with statistical analysis of the likelihood of category pairings in order to determine a first and one or more second categories for the item of interest. In order to assign categories in this manner, first and second category candidates may be identified, as discussed above, using relevance assessments of unrestricted and restricted categories and one or more rules. Notably, however, first and second categories are not assigned in some embodiments to the item of interest based upon the deepest common ancestor of the first and second category candidates.

Instead, to establish which of the first and second category candidates is to be assigned to the item of interest, a statistical analysis may be performed to assess the likelihood that a first category candidate may be combined with a second category candidate. For those pairings having a statistical likelihood less than a threshold value, the pairing of first and second category candidates may not be assigned as categories to the item of interest. However, for those pairings having a statistical likelihood greater than the threshold value, the pairing of first and second category candidates may be assigned to the item of interest.

The statistical likelihood of pairings of first and second category candidates may be generated using statistical frameworks for likelihood calculations, as known in the art. In certain embodiments, the likelihood pairing first and second category candidates may be generated prior to receiving a request to categorize the item of interest and may be stored for later retrieval in the data store 116. For example, the analysis component 114, or other computing device in communication with the item categorization service 102, may generate and store likelihoods of pairings of first and second category candidates. The stored likelihood values may also be periodically updated, as necessary. In other embodiments, the likelihood of pairing the first and second category candidates may be determined by the analysis component 114, or other computing device in communication with the item categorization service 102, during the process of assigning the first and second category candidates to the item of interest.

For example, assume that for an item of interest, "silk pajamas" the first category candidates, listed from highest to lowest relevance, are: "clothes," "lingerie," "shoes," "pajamas," and "pants," with a deepest common ancestor of "clothes." Further assume that, for the category "clothes," a rule is obtained which identifies "material" as category attribute for "clothes" that may be employed for refining "clothes." From this rule, second category candidates of "flannel," "silk," "denim," "satin," and "corduroy" may be identified. Assuming that the likelihood threshold is 0.65 and the likelihood of pairing the category "pajamas" with "silk" is 0.95, "silk" and "pajamas" may each be assigned as categories of the item of interest, as their likelihood of pairing lies above the selected threshold. Further assuming that the likelihood of "lingerie" and "corduroy" is 0.10, this pairing of first and second categories may not be assigned to the item of interest, as their likelihood of pairing is less than the threshold.

It may be understood that more than one pairing of first and second categories may be assigned in this manner. Continuing the example above, assume that "clothes" and "silk" possess a likelihood of 0.90. While the likelihood of this pairing is not as high as "pajamas" and "silk," it still exceeds the threshold of 0.65 and, therefore, these categories may also be assigned to the item of interest.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for categorizing items, the system comprising:
    a network-based service configured to:
        receive a request to categorize an item of interest, the request including item information regarding the item of interest; and
        transmit the request to an item categorization service;
    a data store configured to store categories for items, wherein at least a portion of the categories are hierarchically organized with respect to one another; and
    the item categorization service in communication with the data store and the network-based service, the item categorization service configured to:
        assign a first category to the item of interest by:
            determining a plurality of first category candidates based at least in part upon an assessment of the relevance of the item information with one or more first categories stored by the data store; and
            assigning, as the first category for the item of interest, a first common ancestor of the hierarchically organized first category candidates, the first common ancestor comprising a category that is hierarchically superior to any remaining first category candidates; and
        assign a second category to the item of interest by:
            determining a plurality of second category candidates based at least in part upon an assessment of the relevance of the item information with one or more second categories stored by the data store; and
            assigning, as the second category for the item of interest, a second common ancestor of the hierarchically organized second category candidates, the second common ancestor comprising a category that is hierarchically superior to any remaining second category candidates.

2. The system of claim 1, wherein the item categorization service is further configured to transmit updated item information, including the assigned first and second categories, to the network-based service.

3. The system of claim 1, wherein the common ancestor of the respective first and second category candidates comprises the deepest common ancestor of the respective first and second category candidates, wherein the deepest common ancestor comprises the deepest category in the hierarchically organized categories that is common to the respective first and second category candidates.

4. The system of claim 1, wherein the first and second categories are represented, at least in part, by one or more category attributes and respective category attribute values.

5. The system of claim 4, wherein each of the second category candidates comprises a selected category attribute and respective category attribute value of the first category.

6. A system for categorizing items, the system comprising:
    a data store that stores a plurality of hierarchically organized categories for items, each of the hierarchically organized categories represented by at least one category attribute and corresponding category attribute value; and
    an item categorization service in communication with the data store, the item categorization service configured to:
        receive item information for an item of interest, the item information comprising at least one item attribute and a corresponding item attribute value for the item of interest;
        assign a first category for the item of interest from first categories of the hierarchically organized categories stored by the data store;
        identify a category attribute of the assigned first category;
        obtain at least one second category that comprises the identified category attribute and corresponding category attribute value;
        determine one or more second category candidates based at least in part upon an assessment of the relevance of the item information with the at least one second category; and
        assign one of the second category candidates as a second category for the item of interest based at least in part upon the hierarchical positions of the one or more second category candidates with respect to one another such that at least one of the remaining second category candidates is a sub-category of the second category.

7. The system of claim 6, wherein assigning the first category for the item of interest from the first categories comprises assessing the relevance of the at least one category attribute and corresponding category attribute value of each of the first categories to the received at least one item attribute and corresponding item attribute value.

8. The system of claim 7, wherein assigning the first category for the item of interest from the first categories further comprises identifying a selected number of the first categories having the highest assessed relevance value as first category candidates.

9. The system of claim 8, wherein assigning the first category for the item of interest from the first categories further comprises selecting a deepest common ancestor of the hierarchically organized first category candidates, wherein the deepest common ancestor comprises the deepest category in the hierarchically organized categories that is common to all of the hierarchically organized first category candidates.

10. The system of claim 6, wherein at least one of the first categories does not comprise the identified category attribute of the assigned first category.

11. The system of claim 6, wherein assessing the relevance of the item information with the at least one second category comprises assessing the relevance of the at least one second category attribute and corresponding category attribute value of the at least one second category to the received at least one item attribute and corresponding item attribute value.

12. The system of claim 6, wherein the item categorization service is further configured to update the item information for the item of interest with the assigned first category and the assigned second category and transmit the updated item information for storage.

13. The system of claim 6, wherein the category attribute of the assigned first category is identified from one or more rules stored by the data store.

14. The system of claim 6, wherein assigning the second category for the item of interest further comprises selecting a deepest common ancestor of the hierarchically organized second category candidates, wherein the deepest common ancestor comprises the deepest category in the hierarchically organized categories that is common to all of the hierarchically organized second category candidates.

15. A computer-implemented method for categorizing items, the method comprising:
    under control of one or more configured computer systems:
        receiving item information for an item of interest, the item information comprising one or more item attributes and respective item attribute values for the item of interest;
        assigning a primary category describing an item of interest, the primary category selected from a first search index comprising one or more hierarchically organized first categories having first attributes and respective first attribute values;
        identifying a category attribute describing the assigned primary category;
        obtaining a second search index comprising one or more hierarchically organized second categories, wherein each of the second categories includes the identified category attribute of the primary category;
        determining one or more secondary category candidates based at least in part upon an assessment of the relevance of the item information with each of the one or more hierarchically organized second categories; and
        assigning one of the second category candidates as a secondary category describing the item of interest based at least in part upon the hierarchical positions of the secondary category candidates with respect to one another such that at least one of the remaining second category candidates is a sub-category of the second category.

16. The computer-implemented method of claim 15, wherein assigning the primary category describing the item of interest from the first search index comprises assessing the relevance of at least one of the category attributes and respective category attribute values of respective first categories to the received item attributes and item attribute values.

17. The computer-implemented method of claim 16, wherein assigning the primary category describing the item of interest from the first search index further comprises identifying a selected number of the first categories having the highest assessed relevance value as first category candidates.

18. The computer-implemented method of claim 17, wherein assigning the primary category describing the item of interest from the first search index further comprises selecting a deepest common ancestor of the hierarchically organized first category candidates as the primary category, wherein the deepest common ancestor comprises the deepest category in the hierarchically organized first categories that is common to the hierarchically organized first category candidates.

19. The computer-implemented method of claim 15, wherein at least one of the first categories included in the first search index does not comprise the identified category attribute.

20. The computer-implemented method of claim 15, wherein assessing the relevance of the item information with respective second categories comprises assessing the relevance of at least one of the category attributes and respective category attribute values of respective second categories to the received item attributes and item attribute values.

21. The computer-implemented method of claim 15, further comprising updating the item information with the assigned primary category and the assigned secondary category and transmitting the updated item information for storage.

22. A computer-readable medium having instructions stored thereon, wherein the instructions, when executed by a computing apparatus, cause the computing apparatus to:
   receive item information for an item of interest, the item information comprising one or more item attributes and corresponding item attribute values for the item of interest;
   assign a first category for the item of interest from hierarchically organized first categories stored by a data store;
   identify a category attribute of the assigned first category;
   obtain one or more hierarchically organized second categories that comprise the identified category attribute and a corresponding category attribute value;
   determine one or more second category candidates based at least in part upon an assessment of the relevance of the item information with each of the second categories; and
   assign one of the second category candidates a second category for the item of interest based at least in part upon the hierarchical positions of the second category candidates with respect to one another such that at least one of the remaining second category candidates is a sub-category of the second category.

23. The computer-readable medium of claim 22, wherein assigning the first category for the item of interest from the first categories comprises assessing the relevance of at least one of the category attributes and category attribute values of respective first categories to the received item attributes and item attribute values.

24. The computer-readable medium of claim 22, wherein assigning the first category for the item of interest from the first categories further comprises identifying a selected number of the first categories having the highest assessed relevance value as first category candidates.

25. The computer-readable medium of claim 24, wherein assigning the first category for the item of interest from the hierarchically organized first categories further comprises selecting a deepest common ancestor of the first category candidates, wherein the deepest common ancestor comprises the deepest category in the hierarchically organized first categories that is common to the first category candidates.

26. The computer-readable medium of claim 22, wherein at least one of the first categories does not comprise the identified category attribute of the assigned first category.

27. The computer-readable medium of claim 22, wherein assessing the relevance of the item information with each of the second categories comprises assessing the relevance of at least one of the second category attributes and category attribute values of the second categories to the received item attributes and item attribute values.

28. The computer-readable medium of claim 22, further comprising updating the item information with the assigned first category and the assigned second category and transmitting the updated item information for storage.

* * * * *